June 8, 1965 H. C. PLUMMER 3,187,505
GAS TURBINE FUEL REGULATOR
Filed Aug. 13, 1962 3 Sheets-Sheet 2
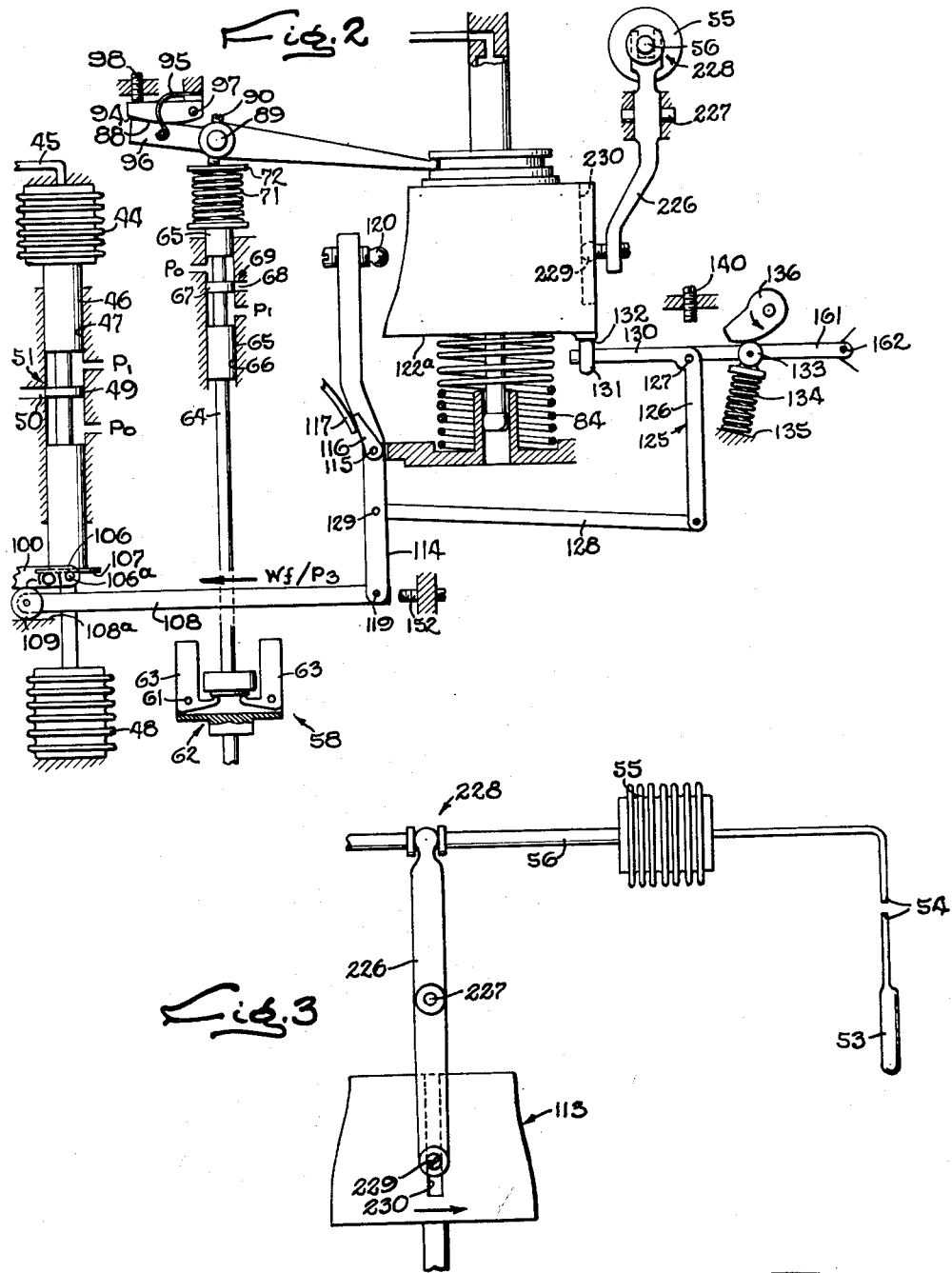
INVENTOR
Harland C. Plummer
By Wolfe, Hubbard, Voit & Osann
ATTORNEYS

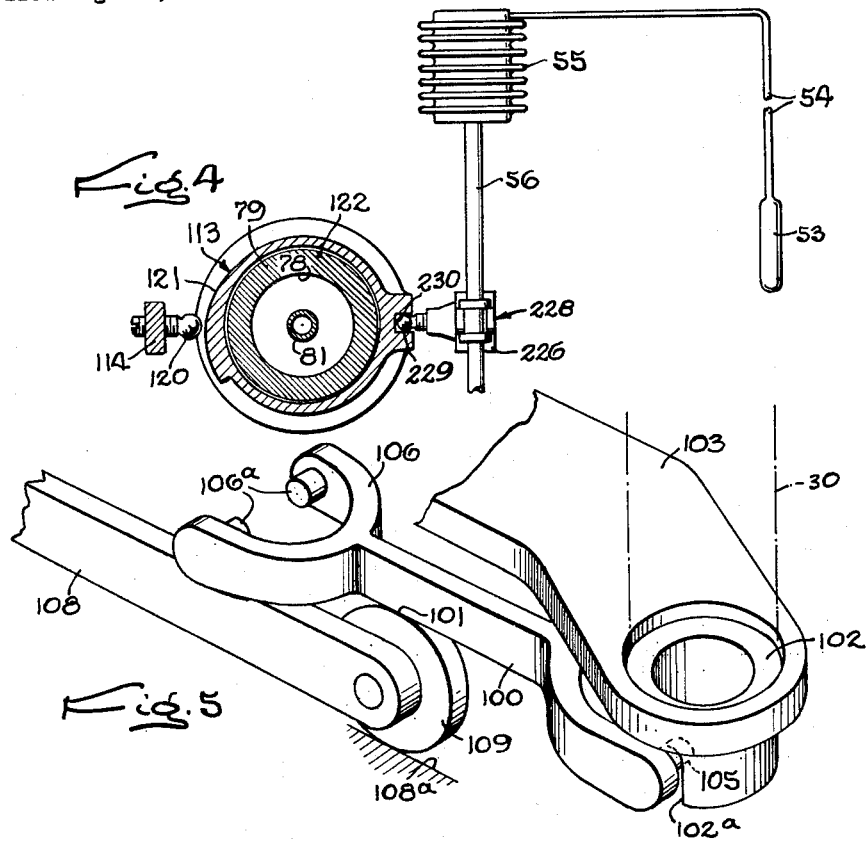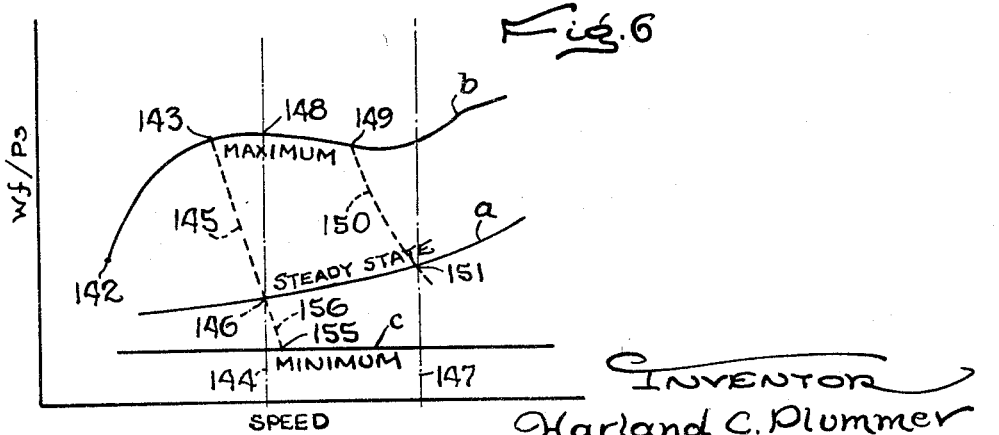

of the turbine whose main shaft is suitably coupled to a shaft 16 extending into the regulator casing 15. Another extension 18 of the turbine shaft is coupled to the main pump 19 which delivers fuel at a high pressure P1 usually about 400–1200 p.s.i. to a pipe 20 extending through the wall of the casing 15 and communicating with a passage 21 leading to the inlet of the main valve 10. Fuel from a storage tank (not shown) is supplied at relatively low pressure P0, usually 37–110 p.s.i., to the inlet of the main pump by the usual so-called boost pump driven by the turbine or an external power source.

United States Patent Office 3,187,505
Patented June 8, 1965

3,187,505
GAS TURBINE FUEL REGULATOR
Harland C. Plummer, Rockford, Ill., assignor to Woodward Governor Company, Rockford, Ill., a corporation of Illinois
Filed Aug. 13, 1962, Ser. No. 216,484
4 Claims. (Cl. 60—39.28)

This invention relates to regulators for aircraft gas turbines and the like of the type in which the fuel flow during steady-state operation is controlled by a main speed governor whose action is restricted when the actual fuel flow reaches or exceeds a maximum permissible limit computed continuously from a combination of operating parameters such as speed, compressor discharge pressure and inlet air temperature. The computation is usually made through the medium of a three dimensional cam moved axially and turned angularly in accordance with the changing values of two of the parameters.

The primary object of this invention is to provide a fuel regulator of the above character which will perform reliably all of the necessary steady-state and fuel limiting functions by mechanism which, as compared to prior regulators, is far less expensive to produce and is substantially smaller in size.

Another object is to provide a regulator in which a single speed governor controls the fuel flow during steady-state operation and also provides the speed signal for computing the maximum fuel limit.

A further object is to combine the parameters for controlling the limit fuel flows by a novel force balancing system as contrasted with the displacement balancing systems heretofore used.

Still another object is to transmit the speed regulating motions of the speed governor to the 3D cam and utilize the motions of the latter to position the fuel valve during steady-state operations.

A further object is to provide a novel mechanism for transferring the control of the fuel valve back and forth between steady-state and limit operations by a novel mechanism which is adjustable manually to select any desired steady-state operating speed.

Another object is to utilize the space within the 3D cam as the cylinder for the hydraulic servo controlled by the speed sensor.

Other objects and advantages of the invention will become apparent from the following detailed description taken in connection with the accompanying drawings, in which FIGURE 1 is a schematic view and hydraulic circuit diagram of a gas turbine regulator embodying the novel features of the present invention.

FIG. 2 is a view similar to FIG. 1 with the parts positioned under a different operating condition.

FIG. 3 is a fragmentary sectional view taken along the line 3—3 of FIG. 1.

FIG. 4 is a fragmentary section taken along the line 4—4 of FIG. 1.

FIG. 5 is a perspective view of part of the feedback lever of the force balancing system.

FIG. 6 shows typical curves of the operating characteristics of a gas turbine controlled by the improved regulator.

Figure 1:
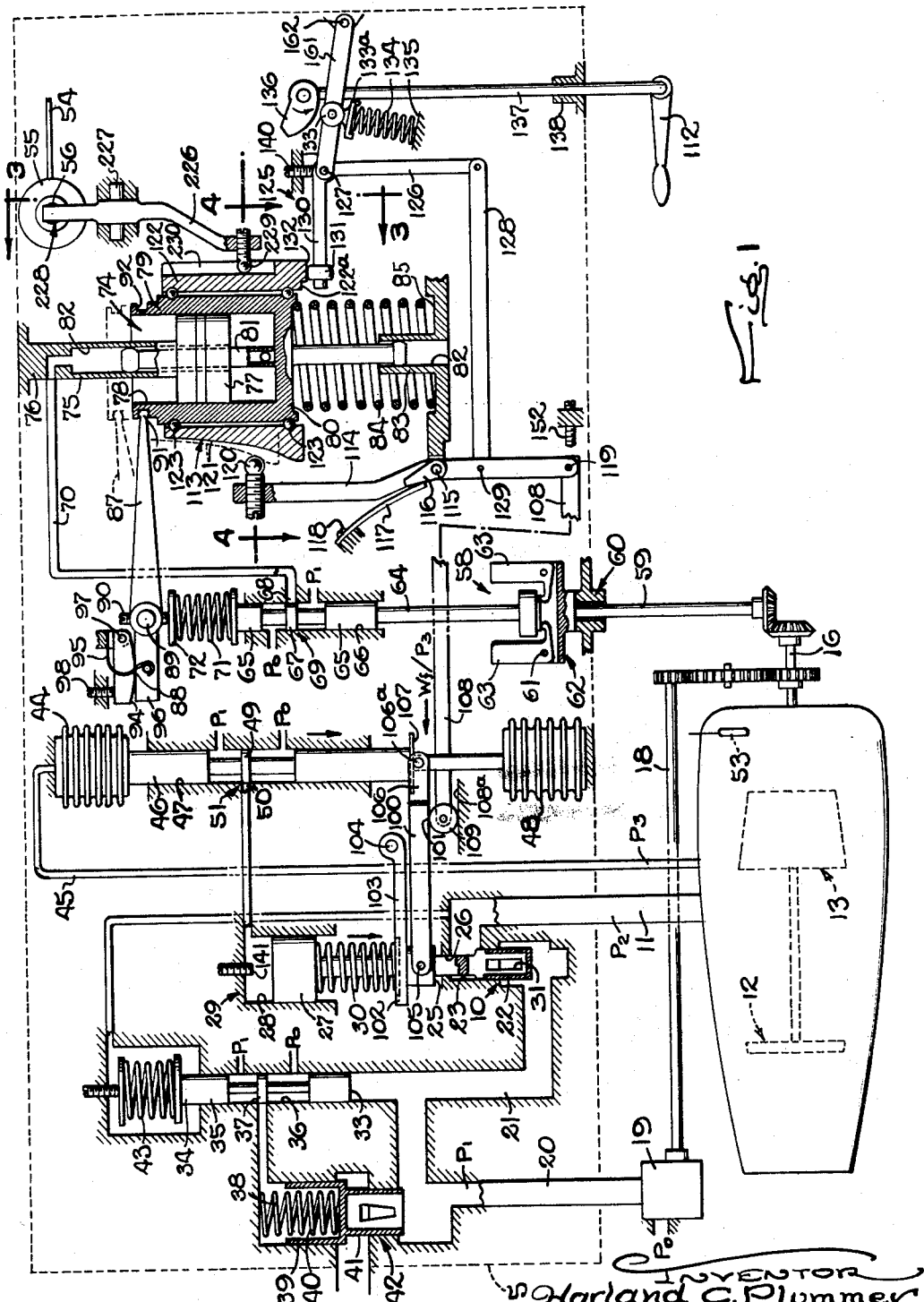

The improved regulator is especially adapted for use in adjusting the opening of a valve 10 to meter the flow of liquid fuel under pressure to a passage 11 leading to the burners of a gas turbine 12 driving the usual rotary compressor 13. The valve and the parts governing its operation are designed to fit compactly within a fluid filled casing 15 indicated by the dotted enclosure and the hatching in FIG. 1. The casing is clamped to the exterior The arrows applied to the drawings indicate in each instance the direction of an increase of motion or a parameter.

Herein the valve 10 comprises a hollow cylindrical cup 22 slidable in an axially fixed cylinder 23 communicating at opposite ends with the passages 11 and 21. The valve cup is on the lower end of the rod 25 slidable in a cylinder 28 and carrying the piston 27 to form a hydraulic servo 29 and biased by a compression spring 30 in the fuel decreasing direction. In different positions of the piston, varying areas of slots 31 in the walls of the cup 22 are uncovered thus determining the rate of fuel flow to the turbine burners.

To provide the usual constant pressure drop across the fuel valve 10, the supply pressure P1 and the burner pressure P2 are exerted on opposite ends 33 and 34 of a plunger 35 slidable in a cylinder 36 and carrying a land 37 cooperating with a port to form a pilot valve controlling the flow of high pressure to and from a cylinder 38. A piston 39 slidable in the latter is urged in the valve closing direction by a spring 40 and carries the movable member 41 of a valve 42 for by-passing fluid out of the passage 20. The force of an adjustable spring 43 supplements P2 to balance P1 on the plunger so that the pilot valve is actuated automatically and through the piston 39 governs the rate of by-pass of fuel out of the supply line 20.

To sense changes in the compressor discharge pressure P3, a bellows 44 fixed at one end to the casing 15 communicates through a passage 45 with the discharge area of the compressor 13. The free end of the bellows is coupled to one end of a plunger 46 slidable in a cylinder 47 and connected at its other end with the free end of an evacuated bellows 48. Thus, the plunger is shifted back and forth in accordance with absolute pressure changes in the compressor discharge. A land 49 on the plunger cooperates with a port 50 to form a pilot valve 51 controlling the admission of high pressure fluid P1 to or the escape of fluid to the low pressure area P0 from the cylinder 28 thus varying the energization of the servo 29 and therefore the position of the fuel valve 10 and the stressing of its biasing spring 30.

Changes in the temperature of the air admitted to the compressor affect a bulb 53 communicating through a tube 54 with a fluid filled bellows 55 which expands and contracts with changes in T2 correspondingly moving a rod 56 slidable in the casing 15.

Changes in the speed of the turbine are sensed by a speed governor 58 including a shaft 59 journaled at 60 in the casing 15 and coupled to the turbine shaft 16. Pivoted at 61 on a ball-head 62 fast on the upper end of the shaft 59 are upstanding flyweights 63 having inwardly projecting arms bearing upwardly through a suitable bearing against the lower end of a valve plunger 64. Lands 65 on the plunger slide in a cylinder 66 while an intermediate land 67 cooperates with a port 68 to provide a pilot valve 69 controlling the flow of high pressure P1 fluid into a passage 70 or the flow of fluid out of the latter to the low pressure P0 area. When the land 67 is centered on the port as shown in FIG. 1, the valve 69 is closed and the passage 70 is blocked. At this time, the axially and upwardly directed forces exerted by the flyweights 63 on the valve plunger exactly balance the downward force exerted on the upper end of the plunger by a compression type speeder spring 71 bearing at its upper end against an axially adjustable abutment 72 which may be an anti-friction bearing.

The passage 70 communicates with a hydraulic servo 74 which is of special construction in accordance with another aspect of the present invention and includes a hollow rod 75 fixed at 76 to the casing 15 and carrying a piston 77 through which the passage extends. The piston is slidably sealed within a cylinder 78 in the form of a cup 79 closed at its lower end 80 and having oppositely projecting stems 81 which slide in guides 82 formed by the piston rod 81 and a fixed tube 83. Downward movement of the cup is opposed by a compression spring 84 acting against a fixed abutment 85 so that the piston and cup constitute a single acting or spring loaded hydraulic servo.

In order that the axial position of the cup 79 will at all times correspond to the prevailing speed of the turbine, the movements of the cup are transmitted back to the speeder spring 71 to change the stressing of the latter and recenter the pilot valve 69 after each speed deviation. Such restoring action is achieved through a lever 87 fulcrumed at 88 and pivotally connected at 89 intermediate its ends to a screw 90 carrying the abutment 72 and adjustable to vary the position of the latter relative to the lever. The free end 91 of the latter rides in an annular groove 92 around the upper open end of the cup 79. As a result, an increase in the speed of the turbine above the prevailing speed setting of the governor or stressing of the speeder spring 71 lifts the land 67 above the port 68 admitting high pressure P1 fluid into the passage 70 to force the cup 79 downwardly. This movement is accompanied by clockwise turning of the lever 87 and lowering of the abutment and further compression of the spring 71 until the valve land 67 has been recentered on the port 68. At this time, the position of the cup 79 corresponds precisely to the speed of the turbine. By such restoring or recentering action, the governor becomes a true speed droop governor so as to possess inherent stability at all speeds.

Means is preferably provided to shift the fulcrum 88 inwardly and outwardly along the restoring lever 87 so that the movement of the servo cup 79 is truly linear with respect to the turbine speed. This is accomplished herein by holding the fulcrumed end of the lever against an arcuate surface 94 as by a spring 95 on a lever 96 fulcrumed at 97 and adjustable by a screw 98. Thus, as the cup 79 is moved downwardly in response to an increase in speed, the fulcrum shifts outwardly away from the governor axis.

For numerous gas turbines, manufacturer's specification calls for changing the rate of fuel flow $Wf$ in accordance with the product of $P3 \times f(N,T)$, P3 is the compressor discharge pressure, N is the turbine speed and T is the temperature of the air admitted to the turbine inlet. In meeting this specification, the present regulator produces the curves such as those shown in FIG. 6, $a$ representing the fuel flow variations during steady-state operation at different engine speeds. The maximum fuel limit is shown by the curve $d$ while the minimum permissible fuel flow to prevent flame-out is represented by the curve $c$.

To compute the maximum fuel flow (curve $d$) permissible under different turbine and ambient air conditions, the invention contemplates combining the speed and temperature measurements made by the sensors 58 and 53 with the P3 measurement by the sensor 44 in a novel manner to form a force balancing system as distinguished from a displacement balancing system operating to vary the energization of the servo 29 and therefore the degree of opening of the fuel valve 10. This is accomplished through the medium of a lever 100 rocked back and forth by changes in one of the measured parameters, P3 in this instance, and in the stressing of the servo biasing spring 30 and having a fulcrum 101 which is shifted back and forth along the lever to vary the effective ratio of the latter in response to a combination of the other two measured parameters, that is, turbine speed and air inlet temperature in this instance.

Herein, the servo biasing spring 30 bears against an abutment 102 formed by the enlarged free end (FIG. 5) of a lever 103 fulcrumed at 104 (FIG. 1) and slotted at 102$^a$ on the underside of the abutment 102 to receive cross pins 105 on the forked end of the lever 100 thus pivotally connecting the abutment to the normally longer end portion of the latter lever. The latter is a substantially straight bar and the opposite and shorter end portion is similarly forked at 106 and carries pins 106$^a$ bearing upwardly against a shoulder 107 fixed to the plunger 46 of the P3 sensor. To provide for shifting the fulcrum 101 along the lever 100, an elongated bar 108 is disposed in the plane of the lever and mounted for endwise reciprocation. One end of the bar is disposed between the underside edge of the lever and an opposed flat surface 108$^a$ fixed to the casing 15 for engagement with a roller 109 journaled on the bar and disposed on its opposite side against the underside of the lever 100.

With this arrangement, the force of the spring 30 is balanced through the medium of the lever 100 against the force due to P3 exerted on the lever through the bellows 44 and the plunger 46. Thus, a rise in P3 lowers the land 49 below the port 50 admitting high pressure fluid to the cylinder 28 of the servo moving the piston 27 downwardly to further open the main valve 10 and correspondingly move the upper end of the spring 30 while rocking the lever 100 counter-clockwise. The change in valve position is thus fed back to the plunger thus raising the latter until the land is again recentered on the port as the increased compression of the feedback spring is balanced against the increased P3.

In this true force balancing system, it will be observed that in response to any change in P3, the movement of the plunger 46 is only enough to shift the pilot land 49 off center so that very little movement is required to accommodate the wide range over which P3 may change in service use. Since the position of the servo piston determines the rate of fuel flow ($Wf$) and the lever 100 is rocked back and forth with changes in P3, a constant ratio of $Wf/P3$ is maintained when the position of the fulcrum 101 is fixed. This ratio is increased and decreased respectively as the fulcrum is shifted to the left and right along the feedback lever 100. Such shifting is effected automatically under the control of the other two parameters, turbine speed and inlet air temperature, and is correlated with the construction of the gas turbine to be controlled to produce the operating characteristics desired by the turbine manufacturer, such for example as shown by the curves of FIG. 6.

The use of the speed governor 58 to control the fuel flow during steady-state operation and also to assist in computing the maximum permissible fuel limit so as to produce the desired operating curves (FIG. 6) while permitting manual selection of the turbine speed is made possible by providing for endwise shifting of the fulcrum shifting or fuel regulating bar 108 by variations in any one of three independent ways, namely, changes in turbine speed as determined by the governor controlled servo 74 above described, by manual adjustment of a throttle arm 112 operated by the pilot, and by changes in the contour of a three dimensional cam 113. To these ends, separate mechanical connections operable individually or in combination with each other are extended to the end of the bar 108 opposite the shiftable fulcrum 101.

Herein the 3D cam connection comprises an elongated generally straight lever 114 fixed about midway between its ends to a rockshaft 115 journaled on the casing 15 and carrying an arm 116. A leaf spring 117, secured at 118 cantilever fashion to the casing, bears at its free end against the arm 116 so as to bias the lever clockwise and thus at all times load or take up the slack in all three of the connections above referred to. The lower end of the lever is pivotally connected at 119 to the end of the bar 108 and the upper end of the lever carries a follower 120 adapted to engage the 3D surface 121 of the cam with point contact so that, when in contact with the cam surface, it will be spaced from the cam axis a distance corresponding to the $f$ (N, T) part of the above equation determining the maximum permissible fuel flow limit.

To conserve space, the governor servo 74 is disposed within the 3D cam which herein comprises a cup 122 telscoped upwardly and around the cup 70 of the governor servo 74 and journaled on the latter through axially spaced anti-friction thrust bearings 123. Thus supported by the governor servo, the cam is moved axially back and forth with changes in the engine speed sensed by the droop governor 58 which thus acts as a tachometer or straight speed sensor in computing the fuel flow limit as will appear later.

For steady-state operation during which the follower 120 is out of contact with the cam as will appear later, the motion of the governor controlled servo 74 is transmitted directly to the fulcrum adjusting bar 108 through a lever 125 which is preferably a right angle bell-crank in this instance to permit the 3D cam axis to be located at right angles to the bar. An arm 126 depending from the vertically floating fulcrum 127 of this bell-crank is pivotally connected to one end of a link 128 whose other end is pivoted at 129 on the lower end portion of the follower lever 114 at a point spaced a short distance above the connection 119. The other arm 130 of the bell-crank projects horizontally and carries a roller 131 which bears upwardly against the bottom 132 of the 3D cam cup 122. Assuming a fixed position of the pivot 127, it will be seen that the axial movement of the servo cup 79 and 3D cam due to a change in turbine speed sensed by the speed governor will rock the lever 125 and through the lever 114 correspondingly shift the bar and the fulcrum 101. Such shifting by the speed governor alone may take place during steady-state operation by yielding of the spring 117 when the follower 120 is spaced away from the 3D cam as will appear later.

To introduce the temperature (T2) of the air at the turbine inlet as an element in the computation of the fuel limit, the output member 56 of the temperature sensor 53, 55 above described is coupled to the 3D cam 113 through a lever 226 swingable about a fixed fulcrum 227 mounted on the casing 15 intermediate the ends of the lever. For this purpose, one end of the bellows 55 is pivotally connected at 228 to the lever 226 whose other end carries a spherical projection 229 which is disposed in a groove 230 extending longitudinally of the cam. Thus, as the compressor inlet temperature increases and decreases, the projection 229 is swung to the left and right and the cam is turned back and forth correspondingly through an angle of about sixty degrees over which the surface 121 of the cam extends to include the full range of the inlet temperature changes in service use.

To vary the turbine speed at which the speed governor 58 controls the fuel flow under steady-state operation, provision is made for raising and lowering the floating fulcrum pin 127 of the bell-crank 125. For this purpose, this fulcrum is supported on the free end of an elongated substantially straight lever 161 supported at one end in this instance by a pivot 162 fixed to the casing 15. Intermediate its ends, the lever carries a roller 133 on a fitting 133ª forming an abutment for one end of a coiled spring 134 compressed against an abutment 135 fixed to the casing. The roller constitutes the follower of a cam 136 fixed to a shaft 137 which is journaled in a bearing 138 on the casing and is adapted to be adjusted angularly by manually rocking the throttle arm 112 by which the desired operating speed of the turbine is selected by the aircraft pilot through a cable or other suitable connection extended to the airplane cockpit. Upward movement of the floating pivot pin 127 is limited by a stop formed by the end of a screw 140 threaded into the casing 15 and selectively adjustable to determine, as will appear later, the steady-state idling speed of the turbine. The spring 134 is stressed to produce a force capable of overcoming the force of the follower spring 117, the former spring thus acting merely to hold the follower 133 against the cam 136 or the fulcrum pin 127 against the stop 140.

It will be apparent from the foregoing that by rocking the throttle lever 112 counter-clockwise while engaging the roller 133 so as to increase the turbine speed results in lowering of the pivot 127 and bodily swinging of the bell-crank 125 clockwise about the roller 131 as a fulcrum, the lever 114 is rocked clockwise about its fulcrum 115 moving the follower 120 toward the 3D cam surface and shifting the fulcrum 101 to the left to increase the fuel flow if the latter is below the computed limit as evidenced by spacing of the follower 120 away from the cam surface 121. Conversely, adjustment of the throttle 112 to decrease the turbine speed during steady-state operation raises the fulcrum 127 to rock the bell-crank 125 counter-clockwise thus overcoming the spring 117 and, through the lever 114, to shift the bar 108 and the fulcrum 101 to the right and thereby reduce $Wf/P3$.

It will be observed that the part of the maximum fuel limit control as computed by the 3D cam 113 may become effective at any speed of the turbine while the roller 131 whose position normally determines the steady-state operation of the turbine is in engagement with the end 132 of the cam. This is made possible by the yieldable mounting of the fulcrum 127 through the spring 134 which, when the roller 131 is contacting the 3D cam, is adapted to yield and allow the follower 120 to move in accordance with the changing contour of the cam and the maximum fuel flow limit computed thereby.

*Operation*

Let it be assumed that the parts constructed as above described are adapted to vary $Wf/P3$ relative to turbine speed N following the maximum fuel limit or acceleration curve $b$, the steady-state curve $a$, and a deceleration curve $c$ as shown in FIG. 6.

When the turbine is at rest, the servo piston 27 will be urged upwardly against the stop 141 thus holding the fuel valve only partially (usually about 10 percent) open. The 3D cam 113 is raised by the governor to its highest position as shown in phantom in FIG. 1 due to the collapsed condition of the flyweights 63 and its surface 121 will be engaged by the follower 120 which is urged clockwise by the spring 117 so as to push shiftable fulcrum 101 to a position determined by the 3D cam and corresponding to the point 142 on the maximum fuel limit curve $b$. The follower 133 is spaced from the speed setting cam 136 then in idling position so that the spring 134 swings the lever 131 upwardly to carry the floating fulcrum 127 against the idle speed controlling screw 140. Since the follower 120 is against the 3D cam at this time, the roller 131 will be spaced below the lower end 132 of the cam as shown in FIG. 1 a distance determined by the point on the cam surface 121 engaged by the follower 120.

*Starting and acceleration.*—To start the turbine, the usual shut-off valve (not shown) is opened, the turbine is cranked, and the fuel ignited thus initiating acceleration of the turbine to activate the P3 sensor and initiate downward movement of the 3D cam by the governor 58. At this time, the position of the fulcrum 101 is under the sole control of the 3D cam which rocks the lever 114 and shifts the fulcrum 101 so that, through the force balancing lever system above described, the $Wf/P3$ ratio is increased along the curve $b$ starting at 142 and continuing upwardly. As a result of the increasing turbine speed detected by the governor, the 3D cam is shifted axially and downwardly thus bringing the end 132 of the cam into contact with the roller 131 at the point 143. Since the turbine speed is then below the steady-state idle speed 144 determined by the engagement of the floating pivot 127 with the idle speed stop 140, the acceleration of the turbine continues thus continuing the downward movement of the 3D cam and separation of its surface 121 from the follower 120 whose position is then determined by the bell-crank 125 and the idle speed stop 140. As a result, the bell-crank is rocked counter-clockwise by the governor during the further acceleration of the turbine thus shifting the fulcrum 101 to the right so as to vary the ratio of the balancing lever 100 and decrease the ratio $Wf/P3$ until the fuel flow determined by position of the servo piston 27 has been reduced along the droop line 145 and the stress of the feedback spring 30 has been balanced against the prevailing value of P3 at a point 146 on the steady-state curve $a$. At this time, the parts are positioned as shown in full in FIG. 1, the speed maintained through the force balancing system being determined by the prevailing value of P3 and the position of the idle speed trimming screw 140.

*Increase in the speed setting.*—Now, if the throttle lever 112 is swung counter-clockwise to select a new and high turbine speed 147 (FIG. 6), the cam 136 comes into contact with the roller 133 and shifts the lever 161 against the force of the spring 134. The resulting lowering of the floating fulcrum 127 swings the bell-crank 125 bodily and clockwise about the roller 131 as a fulcrum thus permitting the spring 117 to swing the lever 114 clockwise and shift the bar 108 and the fulcrum 101 to the left a distance corresponding to change in the speed setting.

If the speed change selected is wide enough to require a fuel flow increase equal to or greater than the maximum permissible flow as computed by the 3D cam under the prevailing value of P3, the follower 120 on the lever 114 will come into contact with the 3D cam at the point 148 on the curve $b$. Further downward shifting of the fulcrum 127 to accommodate the full change in the speed setting while the follower 120 is against the surfaces 121 of the 3D cam is permitted by bodily rocking of the bell-crank 125 and separation of the roller 131 away from the end of the cam 113. The control of the fuel flow is thus transferred from the governor back to the 3D cam at the point 148 on the maximum limit curve $b$ along which the fuel ratio changes during the ensuing acceleration of the turbine. As the acceleration continues after a speed corresponding to the point 149 has been attained, the control is transferred back to the governor which lowers the 3D cam to rock the bell-crank 125 counter-clockwise to overcome the spring 117 and move the follower 120 away from the cam (FIG. 2) while shifting the fulcrum 101 to the right until the value of $Wf/P3$ at the prevailing value of P3 has been reduced along a droop line 150 far enough to rebalance the force balancing system at the proper ratio for maintaining the selected turbine speed 147.

*Decrease in speed setting.*—If, while the turbine is operating steady-state, the throttle lever is turned clockwise to decrease the turbine speed, the fulcrum 127 is moved upwardly thus rocking the bell-crank 125 bodily and counter-clockwise about the roller 131 as a fulcrum. This pulls the link 128 to the right and rocks the lever 114 against the force of spring 117 to shift the fulcrum 101 to decrease $Wf/P3$. If a substantial reduction of speed setting is made, for example from 151 (FIG. 6) back to 147, the bar 108 will contact the stop screw 152 thus limiting the low limit of $Wf/P3$ to a constant value as seen on curve $c$ of FIG. 6. Deceleration of the turbine continues along the line $c$ and to the left with the bar 108 remaining against the stop 152 to a point 155. Thereafter, the fuel increases upwardly along a part 156 of the governor speed droop line 145 until the force balancing system is rebalanced at the point 146 on curve $a$.

The regulator above described possesses numerous advantages over prior regulators of the same type by virtue of the substantial reduction in the number and complexity of the parts, the extremely compact arrangement of the needed parts, and the use of certain of the parts to perform double functions. The use of a single speed sensor to act as a steady-state governor and also to supply the turbine speed signal for the fuel limit computing system is made possible by the individual loading of the 3D cam follower 120 by the spring 117 and the control linkage 125, 128 and 161 by the spring 134. As a result, the over-all construction of the complete regulator is greatly simplified. Moreover, contact between and wear on the 3D cam and its follower occurs during only a small fraction of the actual service time. Also, the adjustment of the cam by the temperature sensor 53 usually takes place while the follower is out of contact with the 3D cam so that this sensor may be of less rugged construction than in prior gas turbine regulators.

Control of the fuel flow under steady-state conditions by a speed governor having inherent speed droop as contrasted with a more costly isochronous governor is possible with the present regulator by taking advantage of the characteristic of a gas turbine by which steady-state fuel demand and also compressor pressure decrease with altitude. By this action, the compressor acting through the P3 sensor produces an effect analogous to dedrooping the speed governor without the necessity of producing a special dedrooping mechanism in order to obtain the desired close regulation of the turbine speed.

I claim as my invention:

1. In a fuel regulating system for a gas turbine, the combination of,
    (1) a fuel regulator movable back and forth in opposite directions to increase and decrease the fuel flow,
    (2) a three dimensional cam mounted for back and forth movements in axial and angular dimensions,
    (3) a speed droop type governor for sensing changes in the speed of said turbine and adjustably positioning said cam axially in accordance with such changes,
    (4) means for adjustably positioning said cam angularly in accordance with changes in another operating parameter of said turbine,
    (5) a follower for said cam coupled to said fuel regulator and mounted for movement radially toward and away from the cam axis to correspondingly move said member in said fuel increasing and decreasing directions,
    (6) spring means urging said follower toward said cam,
    (7) a speed regulating lever coupled to said follower for back and forth movement therewith and mounted to swing about a fulcrum axis extending transversely of said cam axis,
    (8) a member on said second lever spaced from said fulcrum axis and from the end of said cam during movement of the latter through the initial part of its range of axial speed increasing movement, said member being disposed in the path of the cam so as to be engaged and moved thereby in the remaining part of said range of axial movement whereby to change the position of said regulator in accordance with changes in the turbine speed alone when said follower is out of contact with said cam,
    (9) means supporting said fulcrum axis for bodily shifting along said cam axis, said last mentioned means including a spring stronger than and capable of overcoming said spring means and biasing said fulcrum axis in the direction of the speed decreasing movement of said cam, and
    (10) a manually adjustable stop for limiting the movement of said fulcrum axis by said spring.

2. A gas turbine fuel regulating system as defined in claim 1 in which said follower is on one end of an elongated lever coupled at its other end to said fuel regulator and fulcrumed intermediate its ends to swing about an axis paralleling said shiftable fulcrum axis, and said speed regulating lever comprises an angular bell-crank having one arm carrying said member and extending transversely of said cam axis and a second arm extending along such axis and linked to said follower lever and fuel regulator.

3. In a fuel regulating system for a gas turbine, the combination of, a fuel regulator, means for sensing changes in pressure at the discharge of the compressor of said turbine, mechanism for actuating said regulator to increase and decrease the flow of fuel to said turbine with increases and decreases in said pressure including a lever having a fulcrum shiftable back and forth to vary the ratio of the lever, a three dimensional cam mounted for back and forth movements in axial and angular dimensions, a speed droop type governor for sensing changes in the speed of said turbine and adjustably positioning said cam axially in accordance with such changes, means for adjustably positioning said cam angularly in accordance with changes in another operating parameter of said turbine, a follower adapted to engage the surface of said cam and mounted for movement radially toward and away from the cam axis, a permanent connection between said follower and said fulcrum for positioning the latter to correspond to the radial position of said follower, a member permanently coupled to said follower and mounted at one end of said cam for movement axially of the latter, said member being disposed in the path of the cam so as to be spaced from the cam during movement thereof through part of its range and then to be engaged by the cam and moved thereby in the continued axial movement of the cam during which said follower may be moved away from the cam surface whereby the positioning of said fulcrum may be controlled solely by said governor, and selectively adjustable means for changing the position at which said member is engaged by said cam including means supporting said member for yielding along said cam axis when said follower is being moved by said cam while the member is in contact with the cam.

4. In a fuel regulating system for a gas turbine, the combination of,
   (1) a fuel regulator,
   (2) means for sensing changes in pressure at the discharge of the compressor of said turbine,
   (3) mechanism for actuating said regulator to increase and decrease the flow of fuel to said turbine in accordance with increases and decreases in said pressure including a lever having a fulcrum shiftable back and forth to vary the ratio of the lever,
   (4) a three dimensional cam mounted for back and forth movements in axial and angular dimensions,
   (5) a speed droop type governor for sensing changes in the speed of said turbine and adjustably positioning said cam axially in accordance with such changes,
   (6) means for adjustably positioning said cam angularly in accordance with changes in another operating parameter of said turbine,
   (7) a follower adapted to engage the surface of said cam and mounted for movement radially toward and away from the cam axis,
   (8) connection between said follower and said fulcrum for positioning the latter to correspond to the radial position of said follower,
   (9) spring means urging said follower toward the cam axis,
   (10) a second lever coupled to said follower for back and forth movement therewith and mounted to swing about a fulcrum axis extending transversely of said cam axis,
   (11) a member on said second lever spaced from its fulcrum and from the end of said cam during movement of the latter through part of its range of axial movement, said member being disposed in the path of the cam so as to be engaged and moved thereby in the remaining part of said range of axial movement whereby to change the position of said fulcrum in accordance with changes in the turbine speed alone,
   (12) means supporting said fulcrum axis for bodily shifting along said cam axis, said last mentioned means including a spring stronger than and capable of overcoming said spring means and biasing said fulcrum axis in the direction of the speed decreasing movement of said cam,
   (13) a stop for limiting the movement of said fulcrum axis by said spring, and
   (14) manually operable means for adjusting the position of said stop and change the position of said fulcrum axis for the maintenance of different turbine speeds by said governor, said stop, when moved by said manual means to increase the speed setting of said fulcrum axis, acting through the medium of said second lever to swing said first lever in a direction to shift said fulcrum to increase the fuel flow and also move said follower toward said cam.

References Cited by the Examiner
UNITED STATES PATENTS

| | | | |
|---|---|---|---|
| 2,364,115 | 12/44 | Whitehead | 91—387 |
| 2,822,666 | 2/58 | Best | 60—39.28 |
| 2,824,548 | 2/58 | Roche | 91—387 |
| 2,910,125 | 10/59 | Best | 60—39.28 |
| 2,959,002 | 11/60 | Best | 60—39.28 |
| 3,009,446 | 11/61 | Sunnen | 91—387 |
| 3,068,648 | 12/62 | Fleming | 60—39.28 |
| 3,083,531 | 4/63 | Moellmann | 60—39.28 |
| 3,084,510 | 4/63 | Marscher | 60—39.28 |
| 3,108,435 | 10/63 | Chandler | 60—39.29 |

SAMUEL LEVINE, *Primary Examiner.*